(12) United States Patent
Gaither

(10) Patent No.: US 8,473,687 B2
(45) Date of Patent: Jun. 25, 2013

(54) COMPUTER CACHE SYSTEM WITH STRATIFIED REPLACEMENT

(75) Inventor: Blaine D Gaither, Fort Collins, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 13/464,982

(22) Filed: May 5, 2012

(65) Prior Publication Data

US 2012/0221798 A1 Aug. 30, 2012

Related U.S. Application Data

(62) Division of application No. 12/194,687, filed on Aug. 20, 2008, now Pat. No. 8,200,903.

(60) Provisional application No. 61/066,035, filed on Feb. 14, 2008.

(51) Int. Cl.
*G06F 12/08* (2006.01)

(52) U.S. Cl.
USPC .... 711/134; 711/133; 711/141; 711/E12.022; 711/E12.026

(58) Field of Classification Search
USPC .......... 711/134, 133, 141, E12.022, E12.026
See application file for complete search history.

(56) References Cited

U.S. PATENT DOCUMENTS

| | | |
|---|---|---|
| 6,185,658 B1 * | 2/2001 | Arimilli et al. ............... 711/133 |
| 6,223,256 B1 | 4/2001 | Gaither |
| 6,360,301 B1 | 3/2002 | Gaither |
| 6,574,710 B1 | 6/2003 | Gaither et al. |
| 6,647,466 B2 | 11/2003 | Steely, Jr. |
| 6,662,275 B2 | 12/2003 | Arimilli et al. |
| 6,681,293 B1 | 1/2004 | Solomon et al. |
| 6,748,490 B1 | 6/2004 | Morien |
| 6,751,705 B1 | 6/2004 | Solomon et al. |
| 6,983,348 B2 | 1/2006 | Jamil et al. |
| 7,062,613 B2 | 6/2006 | Jamil et al. |
| 7,100,001 B2 | 8/2006 | Edirisooriya et al. |
| 7,133,975 B1 | 11/2006 | Isaac et al. |
| 7,287,126 B2 | 10/2007 | Desai |
| 2007/0186045 A1 | 8/2007 | Shannon et al. |
| 2009/0210628 A1 | 8/2009 | Gaither |

* cited by examiner

*Primary Examiner* — Yong Choe

(57) ABSTRACT

Methods for selecting a line to evict from a data storage system are provided. A computer system implementing a method for selecting a line to evict from a data storage system is also provided. The methods include selecting an uncached class line for eviction prior to selecting a cached class line for eviction.

20 Claims, 8 Drawing Sheets

COMPUTER CACHE SYSTEM WITH STRATIFIED REPLACEMENT

This application claims the benefit of and is a divisional of copending and allowed U.S. patent application Ser. No. 12/194,687, filed 2008 Aug. 20, which claims the benefit of U.S. Provisional Application No. 61/066,035, filed 2008 Feb. 14, entitled "Computer Cache System With Stratified Replacement", which is hereby incorporated by reference.

BACKGROUND

Most computer systems employ a multilevel hierarchy of memory systems, with relatively fast, expensive, limited-capacity memory at the highest level of the hierarchy (closest to the processor) and proceeding to relatively slower, lower cost, higher-capacity memory at the lowest level of the hierarchy (typically relatively far from the processor). Typically, the hierarchy includes a small fast memory called a cache, either physically integrated within a processor integrated circuit or mounted physically close to the processor for speed. There may be separate instruction caches and data caches. There may be multiple levels of caches. An item that is fetched from a lower level in the memory hierarchy typically evicts (replaces) an item from the cache. The selection of which item to evict may be determined by a replacement method.

The goal of a memory hierarchy is to reduce the average memory access time. A memory hierarchy is cost effective only if a high percentage of items requested from memory are present in the highest levels of the hierarchy (the levels with the shortest latency) when requested. If a processor requests an item from a cache and the item is present in the cache, the event is called a cache hit. If a processor requests an item from a cache and the item is not present in the cache, the event is called a cache miss. In the event of a cache miss, the requested item is retrieved from a lower level (longer latency) of the memory hierarchy. This may have a significant impact on performance. The average memory access time may be reduced by improving the cache hit/miss ratio, reducing the time penalty for a miss, and reducing the time required for a hit.

If a cache stores an entire line address along with the data and any line can be placed anywhere in the cache, the cache is said to be fully associative. However, for a large cache in which any line can be placed anywhere, the hardware required to rapidly determine if an entry is in the cache (and where) may be very large and expensive. For large caches, a faster, space saving alternative is to use a subset of an address (called an index) to designate a line position within the cache, and then store the remaining set of more significant bits of each physical address (called a tag) along with the data. In a cache with indexing, an item with a particular address can be placed only at the one place (set of lines) within the cache designated by the index. If the cache is arranged so that the index for a given address maps to exactly one line in the subset, the cache is said to be direct mapped. In general, large direct mapped caches can have a shorter access time for a cache hit relative to associative caches of the same size. However, direct mapped caches have a higher probability of cache misses relative to associative caches of the same size because many lines of memory map to each available space in the direct mapped cache. If the index maps to more than one line in the subset, the cache is said to be set associative. All or part of an address is hashed to provide a set index which partitions the address space into sets. For a direct mapped cache, since each line can only be placed in one place, no method is required for replacement. In general, all caches other than direct mapped caches require a method for replacement. That is, when an index maps to more than one line of memory in a cache set, we must choose which line to replace.

In the event of a cache miss, typically one line in a cache is replaced by the newly requested line. In the case of a direct mapped cache, a new line replaces a line at one fixed place. In the case of fully associative caches, a replacement method is needed to decide which line in the cache is to be replaced. In the case of set associative caches, a replacement method is needed to decide which line in a set is replaced. The method for deciding which lines should be replaced in a fully associative or set associative cache is typically based on run-time historical data, such as which line is least-recently-used. Alternatively, a replacement method may be based on historical data regarding least-frequently-used. Still other alternatives include first-in first-out, and pseudo-random replacement.

The minimum amount of memory that can be transferred between a cache and a next lower level of the memory hierarchy is called a line, or block, or page. The present patent document uses the term "line," but the invention is equally applicable to systems employing blocks or pages.

In some multilevel caches, each cache level has a copy of every line of memory residing in every cache level higher in the hierarchy (closer to the processor), a property called inclusion. For example, in an inclusive two-level cache system, every entry in the primary cache is also in the secondary cache. Typically, when a line is evicted from an upper level cache, the line is permitted to remain in lower level caches. Conversely, in order to maintain inclusion, if a line is evicted from a lower level cache, the lower level cache must issue a bus transaction, called a back-invalidate transaction, to flush any copies of the evicted line out of upper levels of the cache hierarchy. Each back-invalidate instruction causes any cache at a higher level in the hierarchy to invalidate its copy of the item corresponding to the address, and to provide a modified copy of the item to the lower level cache if the item has been modified. Back-invalidate transactions occur frequently and have a significant impact on overall performance due to increased bus utilization between the caches and increased bus monitoring (snoop) traffic.

Many computer systems employ multiple processors, each of which may have multiple levels of caches. All processors and caches may share a common main memory. A particular line may simultaneously exist in shared memory and in the cache hierarchies for multiple processors. All copies of a line in the caches must be identical, a property called coherency. However, in some cases the copy of a line in shared memory may be "stale" (not updated). If any processor changes the contents of a line, only the one changed copy is then valid, and all other copies must then be updated or invalidated. The protocols for maintaining coherence for multiple processors are called cache-coherence protocols. In some protocols, the status of a line of physical memory is kept in one location, called the directory. In other protocols, every cache that has a copy of a line of physical memory also has a copy of the sharing status of the line. When no centralized state is kept, all caches monitor or "snoop" a shared bus to determine whether or not they have a copy of a line that is requested on the bus.

In a snooping based system, the cache system monitors transactions on a bus. Some of the transactions indicate that an item has been evicted from an upper level of the cache system. However, some transactions may only "hint" that an item has been evicted from a high level of the cache system, but a low level of the cache does not know with complete certainty that the item is not still retained by a higher level. For example, some systems do not implement inclusion at the upper levels of the cache hierarchy. If the system does not implement inclusion at higher cache levels, then a third level cache may see that an item has been evicted from a second level cache, but the third level cache does not know whether a copy of the item is in the first level cache.

BRIEF DESCRIPTION OF THE EMBODIMENTS

DETAILED DESCRIPTION OF THE DRAWINGS

To begin, various systems are described in which methods for replacing cache lines may be used.

Figure 1:
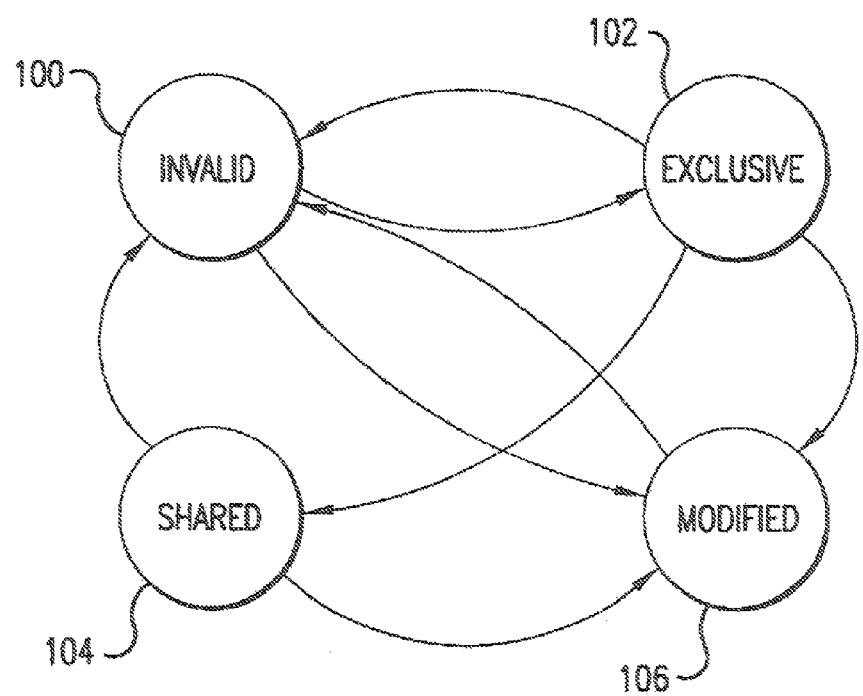
FIG. 1 is a state diagram of a prior art cache coherency protocol.

FIG. 1 illustrates a state diagram for an exemplary prior-art multi-processor cache-coherency protocol in a snooping based system. FIG. 1 illustrates four possible states for each line in a cache. Before any lines are placed into the cache, all entries are at a default state called "invalid" (100). When an uncached physical line is placed into the cache, the state of the entry in the cache is changed from invalid to "exclusive" (102). The word "exclusive" means that exactly one cache hierarchy has a copy of the line. If a line is in an exclusive state in a cache hierarchy for a first processor, and if a second processor requests the same line, the line will then be copied into two cache hierarchies, and the state of the entry in each cache is set to "shared" (104). If a line is modified in a cache, it may also be immediately modified in shared memory (called write through). Alternatively, a cache may write a modified line to shared memory only when the modified line in the cache is invalidated or replaced (called write back). FIG. 1 assumes that the cache is a write-back cache, and accordingly when a line in the cache is modified, the state of the entry in the cache is changed to "modified" (106). The protocol of FIG. 1 is sometimes called a MESI protocol, referring to the first letter of each of the four states.

Figure 2:
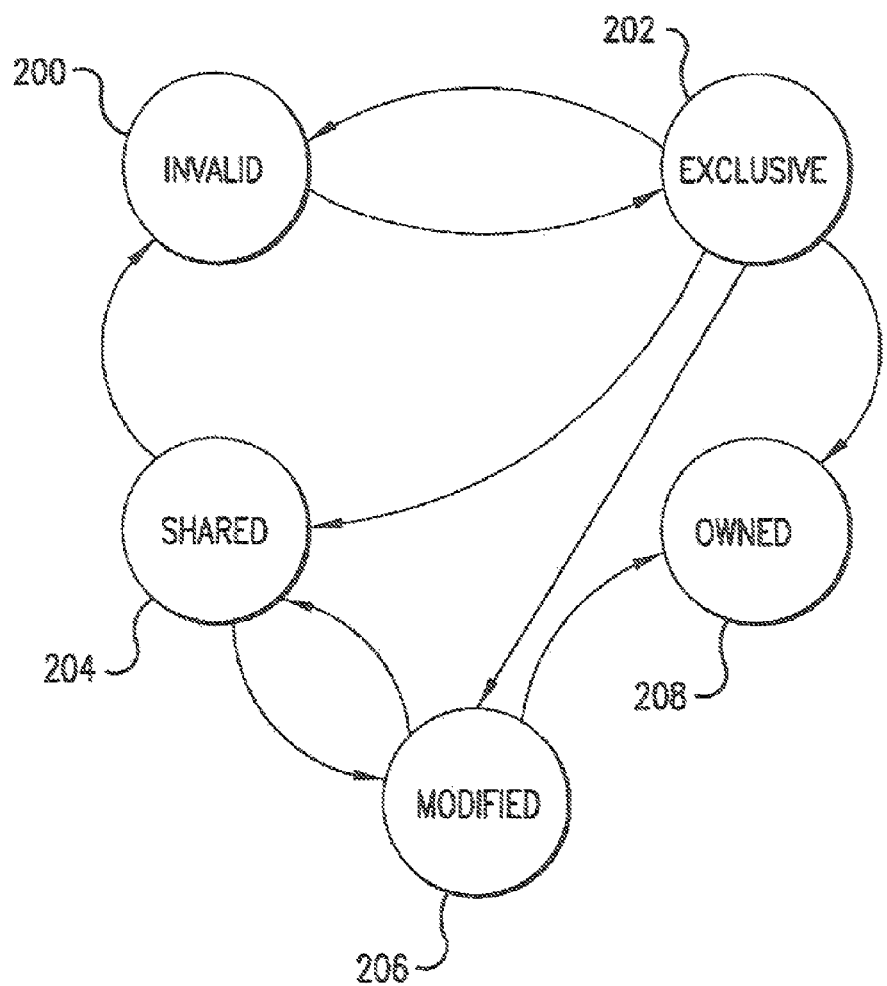
FIG. 2 is a state diagram of a prior art variation of the protocol of FIG. 1.

In the protocol of FIG. 1, the modified state (106) is effectively an exclusive modified state, meaning that only one cache hierarchy in the system has a copy of the modified line. Some systems add an additional modified state to enable multiple caches to hold a copy of modified data. FIG. 2 illustrates a prior art protocol in which an additional state has been added, called "owned" (208). States 200, 202, and 206 in FIG. 2 have the same function as the identically named states for FIG. 1. In contrast, in the protocol of FIG. 2, other cache hierarchies may be holding copies of a modified line in the shared state (204), but only one cache hierarchy can hold a modified line in an owned state (208). Only the one cache holding a modified line in the owned state can write the modified line back to shared memory.

Some computer systems may use a directory instead of a lower level cache. A directory is a set of tags for all of the shared system memory. The tags include state bits to indicate states such as Modified, Exclusive, Shared, and Invalid. The tags can also indicate which caches have copies of a line. For purposes of the descriptions herein, a directory is a cache (which happens to be very large) and the described coherency protocols are equally applicable to states within a directory.

Figure 3:
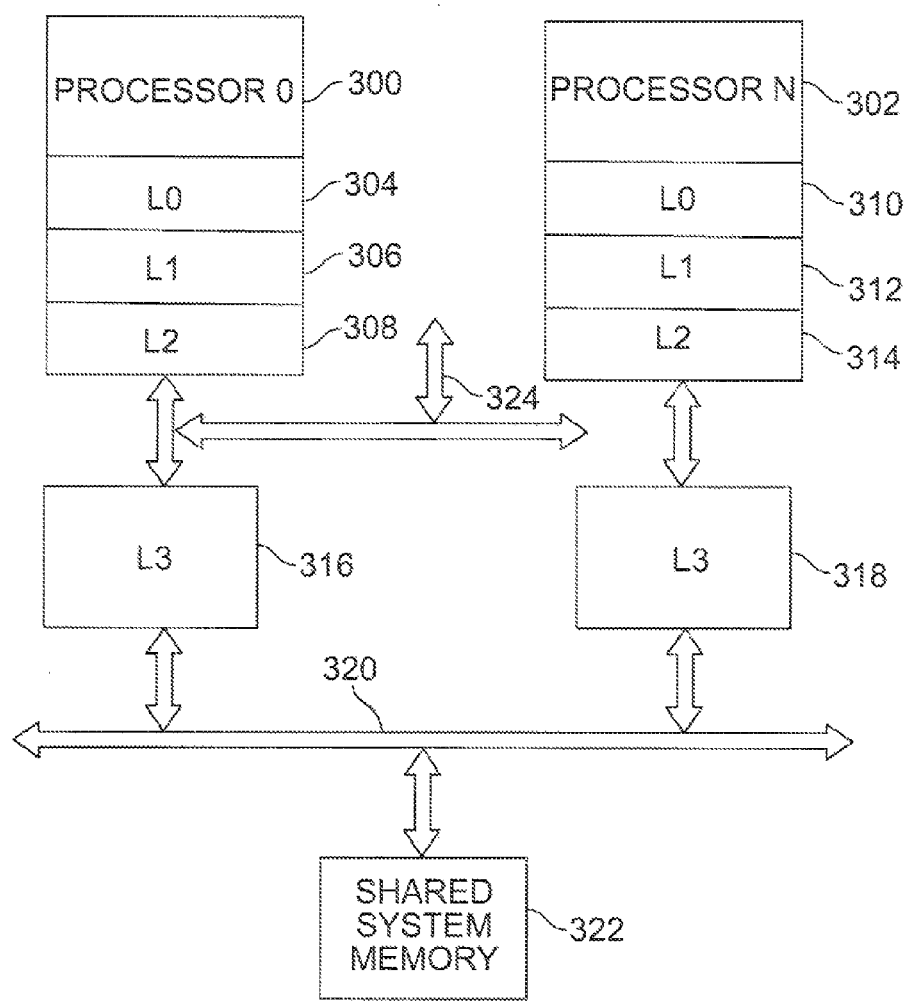
FIG. 3 is a block diagram of an example computer system suitable for use with the cache coherency protocols discussed with reference to FIGS. 4-6.

In FIG. 3, a computer system has N processors, two of which are illustrated (300, 302). Each processor has three levels of internal caches (304, 306, 308 and 310, 312, 314) and a fourth external cache (316, 318). All processors and their associated cache hierarchies share a system bus 320 and a system memory 322. Bus 324 illustrates that multiple processors may share an external cache, such as cache 316. In addition, in various embodiments, the term bus might refer to another form of interconnect such as, e.g., a crossbar or direct connect.

Figure 5:
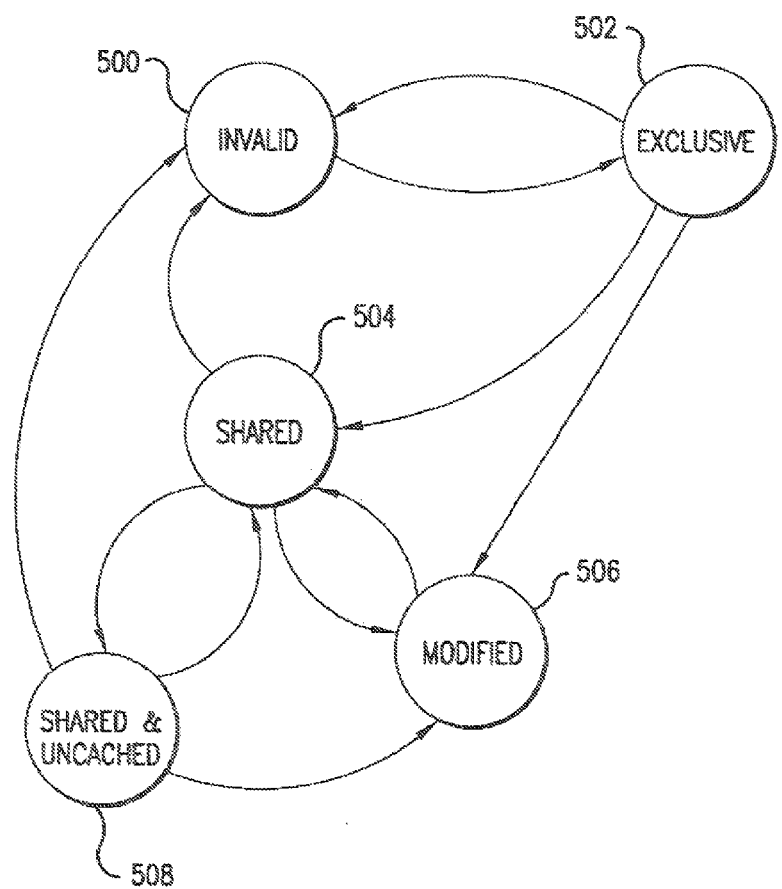
FIG. 5 is a state diagram of a third prior art variation of the protocol of FIG. 1.
Figure 6:
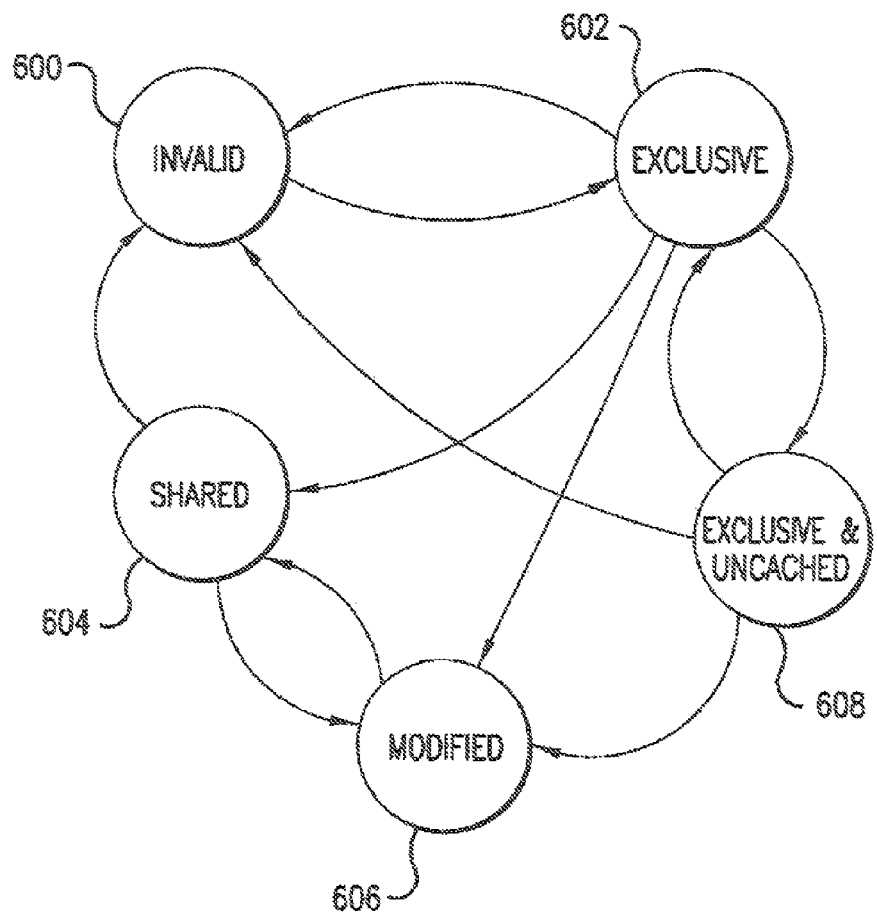
FIG. 6 is a state diagram of a fourth prior art variation of the protocol of FIG. 1.

The well-known MESI protocols illustrated in FIGS. 1 and 2 may be modified to provide for additional possible states for each line in a cache. Examples of such additional possible states are illustrated in FIGS. 4-6 with reference to FIG. 3.

For example, in another prior art cache coherency protocol that might be used for any lower level cache, a lower level cache, for example cache 316, detects when a line is evicted from a higher level cache. If a line has been evicted from a higher level cache, then there is no need for a back-invalidate transaction when the line is evicted from the lower level cache. Accordingly, the lower level cache coherency protocol includes an additional state that indicates that a line is not cached at higher levels, and therefore does not require a back-invalidate transaction when evicted. Thus, as shown in the prior art protocol of FIG. 4, an additional state (Modified uncached), Mu (408), may be added to the prior art protocol of FIG. 1. The additional state could also be added to the prior art protocol of FIG. 2, or in general, any protocol having an M (modified) state. If a line is at state Mu, and the line is evicted, no back-invalidate transaction is generated. For example, in the system in FIG. 3, if a line in cache 316 is at state Mu, and the line is evicted from cache 316, cache 316 does not need to issue a transaction to evict the line from caches 304, 306, or 308.

Figure 4:
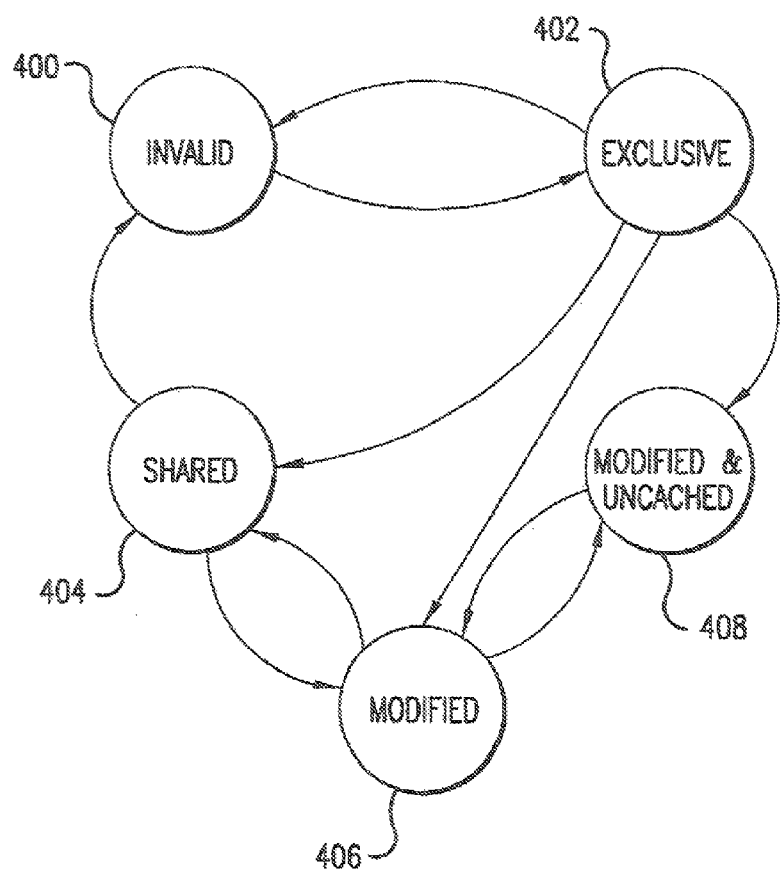
FIG. 4 is a state diagram of a second prior art variation of the protocol of FIG. 1.

In the prior art protocol illustrated in FIG. 4, if a lower level cache detects a write-back transaction from a higher level cache in the same hierarchy, the state of the line that has been evicted from the higher level cache is changed in the lower level cache from M (406) to Mu (408). For example, in FIG. 3, assume that for processor 0 (300), cache L2 (308) evicts a line. L2 then writes-back to a lower level cache (L3) or shared memory (322). Cache L3 (316) detects the write-back transaction, and the corresponding tag or address, and the state of the corresponding entry in L3 (316) is switched to Mu (FIG. 4, 408). If a line having a state of Mu is read, the state is switched to M (406). For example, in FIG. 3, if a line in cache 316 is at state Mu, and the line is then read by processor 0 (300), the state of the line in cache 316 is switched to M (406).

In the system of FIG. 4, a write-back transaction is used by the lower level cache to learn when a modified line is evicted from a higher level cache. If the system provides a transaction or other hint to indicate that a clean line has been evicted from a higher level cache, for example, an explicit write-back/update transaction, then additional states can be added for shared and uncached, and exclusive and uncached. Such additional states are shown in prior art FIGS. 5 and 6. FIG. 5 illustrates an additional state (Shared uncached) state, Su (508), being added to the prior art protocol of FIG. 1. FIG. 6 illustrates an additional state (Exclusive uncached). Eu (608), being added to the prior art protocol of FIG. 1. For FIGS. 5 and 6, detection of a specific transaction or hint indicating eviction of a clean line causes a transition from the shared state 504 to the Su state 508, or transition from the exclusive state 602 to the Eu state 608.

If a line is in the Su (FIG. 5, 508) or Eu (FIG. 6, 608) states in cache 316 (FIG. 3), a subsequent read of the line by processor 300 will cause the line to transition to Shared or Exclusive (respectively). If a line is in the Su or Eu states in cache 316, a write to the line by processor 300 will cause the line to transition to the Modified (406, 606) state in cache 316. If a line is in the Su or Eu states in cache 316, and processor 302 issues a read for the line, the read is broadcast on bus 320. The snoop operation performed by cache 316 will cause the line to transition to Shared (504, 604). There is no need for an invalidate transaction to be sent to caches 304, 306 and 308. If a line is in the Su or Eu states in cache 316, and an invalidate for the line, or a write to the line, is snooped on bus 320, the line will transition to the Invalid state (500, 600) in cache 316, and there is no need for an invalidate transaction to be sent to caches 304, 306 and 308.

The additional Mu, Su, and Eu states, shown in FIGS. 4, 5 and 6 respectively, are not mutually exclusive. Any combination of the additional states may be implemented within one system as appropriate. The prior art protocols illustrated in FIGS. 4-6 are sometimes referred to as the MuMESI protocol.

As discussed above, in snooping based computer system employing a multilevel hierarchy of memory systems, all caches monitor or "snoop" a shared bus to determine whether or not they have a copy of a line that is requested on the bus. However, to enhance the performance of the system, inclusive caches and coherency filters are used to reduce the snoop rate seen by processors upstream of the coherency filter. The coherency filter, which is similar to a cache without any data, keeps track of lines that are held in upper level caches or that are owned by processors above the coherency filter.

Figure 7:
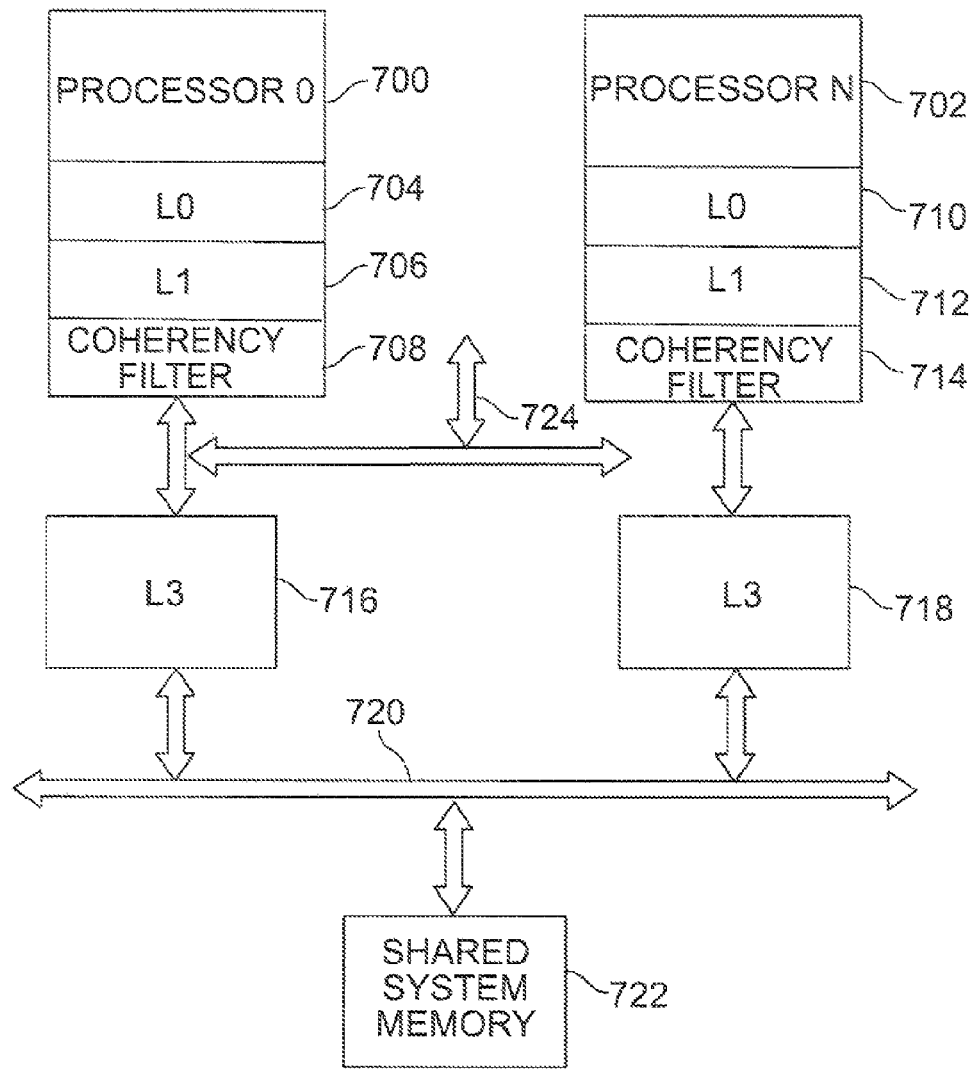
FIG. 7 is a block diagram of an example computer system including a coherency filter.

FIG. 7 illustrates an exemplary computer system including a coherency filter. The computer system of FIG. 7 has N processors, two of which are illustrated (700, 702). Each processor has two levels of internal caches (704, 706 and 710, 712), a coherency filter (708 and 714) and a fourth external cache (716, 718). All processors and their associated cache hierarchies share a system bus 720 and a system memory 722. Bus 724 illustrates that multiple processors may share an external cache, such as cache 716.

The operation of a system having a coherency filter will now be discussed with reference to FIG. 7. When an upper level cache, e.g., cache 704, fetches an item from a lower level in the memory hierarchy, e.g., cache 716, the coherency filter 708 must be updated to reflect the new lines held by the upper caches. When the coherency filter 708 is updated, however, it typically evicts (replaces) an item (and its associated lines) from the coherency filter 708.

There are many methods for determining which lines to replace. For example, as discussed above, many caches use "least recently used" (LRU) or "not recently used" (NRU) replacement methods to try to optimize their hit rates.

Unfortunately, although the coherency filter 708 keeps track of which lines are held in upper level caches, the coherency filter 708 only sees references to itself and does not have any history of upstream use. The coherency filter 708 knows what the cache above (cache 706) recently missed but does not know what the processor 700 successfully accessed (hit) in the caches above (caches 704, 706). For this reason the coherency filter's 708 designation of a line as "recently used" is misleading, and it would be more accurate to refer to the line as "recently faulted." Because upstream caches shield the coherency filter 708 or lower level caches from knowledge that a line is in heavy use upstream, the coherency filter 708 may evict a line that is not recently referenced in the coherency filter 708 but is well-used in an upstream cache, e.g., caches 704, 706.

In conventional systems, back-invalidate transactions must be generated when the coherency filter 708 evicts a line. This serves to assure that caches upstream of the coherency filter 708 do not retain a line that is not also in the coherency filter 708. Therefore, if the coherency filter 708 evicts a line that is well-used by an upper level cache, e.g., caches 704, 706, and causes the line to be invalidated in the upper level cache to maintain coherency, the evicted line must be brought back into the upper level cache. As a result, cache lines are churned as the coherency filter 708 evicts lines and the lines subsequently are replaced in the upper levels from levels below the coherency filter 708.

By stratifying possible targets of eviction, lines that are no longer being used are more likely to be evicted than lines being used in the upper levels of cache. In addition, the hit rates of the upper caches are improved. By using the MuMESI protocol in connection with a stratified replacement method, the eviction of lines held upstream from the coherency filter and the resultant churning of cache lines can be avoided. Although coherency filters in particular have been discussed herein, most caches would similarly benefit from application of the invention and the embodiments discussed herein.

Figure 8:
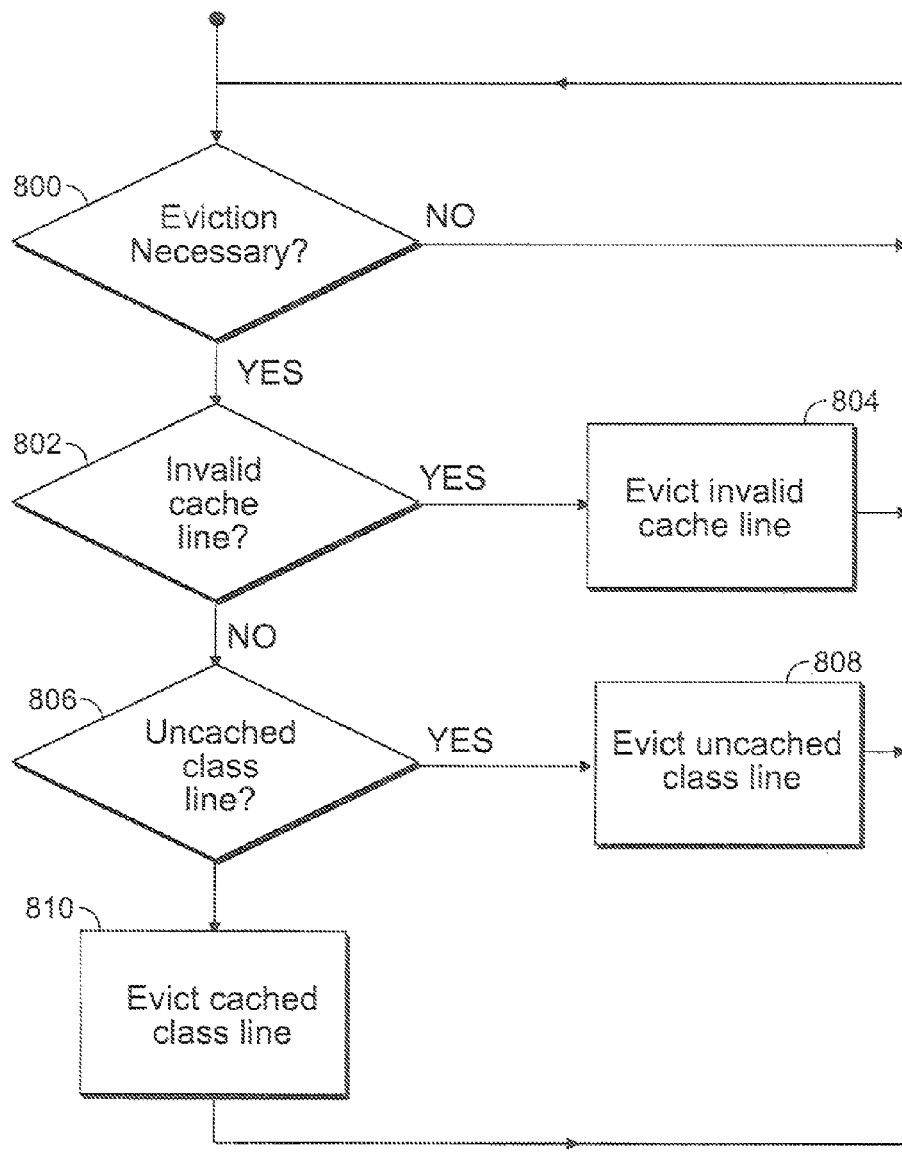
FIG. 8 is a block diagram of an embodiment of a stratified replacement method as described herein.

An embodiment of a stratified replacement method will now be discussed with reference to FIG. 8. In a system applying the MuMESI protocol, a stratified replacement method may be used to select which line to evict from a coherency filter or other low level inclusive cache. In particular, as shown in FIG. 8, a line may be selected for eviction based upon the priority accorded to its MuMESI state. For example, in some embodiments, a stratified replacement method is applied in which invalid lines are evicted first, Mu/Su/Eu lines are evicted second, and M/S/E lines are evicted as a last resort. Invalid lines may also be referred to as lines in the "I" state. Mu/Su/Eu lines are known to be uncached in the higher levels of cache and collectively may be referred to as the "uncached class." In contrast, M/S/E lines are known to be used in upper level caches and collectively may be referred to as the "cached class."

Thus, in the embodiment of the method illustrated in FIG. 8, at step 800 the system determines whether it is necessary to evict a line. In the case of a set associative cache, the system determines which line from within the set to evict. If it is necessary to evict a line, the system proceeds to evict an appropriate line (steps 804, 808, 810). As discussed above, invalid lines are replaced first. Thus, the system determines at step 802 whether there is an invalid line in the cache. If there is an invalid cache line, the invalid cache line is evicted from the cache at step 804. If there is not an invalid cache line to evict, the system determines at step 806 whether there is line in the uncached class (lines in the Mu, Su, or Eu states) in the cache. If there is an uncached class line, the uncached class line is evicted from the cache at step 808. If there is neither an invalid line nor an uncached class line to evict from the cache, a line in the cached class (lines in the M, E, or S states) is evicted from the cache at step 810.

In an embodiment of the method illustrated, a line within the uncached or cached classes may be randomly selected from among other lines in its class. In other embodiments, the LRU and NRU replacement methods are modified.

For example, in a modified-LRU embodiment, the LRU replacement method is modified such that lines in the cached class (the M, S, or E states) are considered to be more recently used than those in the I, Mu, Su, or Eu state. A line in the cached class (the M, S, or E states) is replaced only if there are no I, Mu, Su, or Eu lines in the cache that could be evicted instead. A line in the I state is the first choice for eviction. But, if there is no line in the I state, the least recently used line within the uncached class (Mu, Su, and Eu lines) is replaced. Then, if there is neither a line in the I state nor a line in the uncached class of lines, the least recently used line within the class of cached lines is replaced.

Similarly, in a modified-NRU embodiment, the NRU replacement method is modified such that lines in the I state are evicted first. If there is not a line in the I state, a line in the uncached class (Mu, Su, and Eu lines) is evicted. Finally, if there is neither a line in the I state nor a line in the uncached class, a line within the cached class (M, S, and E lines) is replaced. When evicting a line from either the uncached class or the cached class, a conventional NRU method may be applied to determine which line within the class to evict.

What is claimed is:

1. A method for evicting an item from a data storage system including a cache memory, the method comprising:
   when no item in the cache memory is in an invalid state, determining whether at least one item in the cache memory is in an uncached class;
   when it is determined that the at least one item in the cache memory is in the uncached class, evicting one of the at least one item in the uncached class from the cache memory; and
   when it is determined that no item in the cache memory is in the uncached class, evicting from the cache memory an item in the cached class.

2. The method of claim 1, wherein the determining whether at least one item in the cache memory is in the uncached class comprises:
   determining whether the cache memory includes a plurality of items in the uncached class; and
   when it is determined that the cache memory includes a plurality of items in the uncached class, selecting for eviction one of the plurality of items in the uncached class in accordance with a replacement method,
   wherein the evicting the item in the uncached class comprises evicting the selected item in the uncached class from the cache memory.

3. The method of claim 2, wherein the replacement method is one of a random selection method, a least-recently-used replacement method, and not-recently-used replacement method.

4. The method of claim 1, wherein the evicting an item in the cached class comprises:
   selecting for eviction one of a plurality of items in the cached class in the cache memory in accordance with a replacement method; and
   evicting the selected item in the cached class from the cache memory.

5. The method of claim 4, wherein the replacement method is one of a random selection method, a least-recently-used replacement method, and a not-recently-used replacement method.

6. The method of claim 1, wherein the cache memory is a coherency filter.

7. The method of claim 1, wherein:
   the data storage system includes a cache hierarchy including the cache memory and another cache memory having a higher level than the cache memory; and
   any item in the cache memory that is not stored in the another cache memory is in the uncached class.

8. The method of claim 7, wherein the uncached class includes each of the items in a shared uncached state.

9. The method of claim 1, wherein each of the items stored in the cache memory is one of a line, a block, and a page of memory.

10. A computer system comprising:
    a data storage system including a cache memory, wherein the computer system is to implement stratified replacement in which the computer system is to:
       when no item in the cache memory is in an invalid state, determine whether at least one item in the cache memory is in an uncached class
       when it is determined that the at least one item in the cache memory is in the uncached class, evict one of the at least one item in the uncached class from the cache memory; and
       when it is determined that no item in the cache memory is in the uncached class, evict from the cache memory an item in the cached class.

11. The computer system of claim 10, wherein to determine whether at least one item in the cache memory is in the uncached class, the computer system is to:
    determine whether the cache memory includes a plurality of items in the uncached class; and
    when it is determined that the cache memory includes a plurality of items in the uncached class, select for eviction one of the plurality of items in the uncached class in accordance with a replacement method,
    wherein to evict the item in the uncached class, the computer system is to evict the selected item in the uncached class from the cache memory.

12. The computer system of claim 11, wherein the replacement method is one of a random selection method, a least-recently-used replacement method, and a not-recently-used replacement method.

13. The computer system of claim 10, wherein to evict the item in the cached class, the computer system is to:
    for eviction one of a plurality of items in the cached class in the cache memory in accordance with the a replacement method; and
    evict the selected item in the cached class from the cache memory.

14. The computer system of claim 13, wherein the replacement method is one of a random selection method, a least-recently-used replacement method, and a not-recently-used replacement method.

15. The computer system of claim 10, wherein the cache memory is a coherency filter.

16. The computer system of claim 10, wherein the uncached class includes each of the items in a shared uncached state.

17. The computer system of claim 10, wherein:
    the data storage system includes a cache hierarchy including the cache memory and another cache memory having a higher level than the cache memory; and
    any item in the cache memory that is not stored in the another cache memory is in the uncached class.

18. The computer system of claim 17, wherein the uncached class includes each of the items in any one of a shared uncached state, an exclusive uncached state, and a modified uncached state.

19. The computer system of claim 10, wherein the cached class includes each of the items in any one of a shared state, an exclusive state, and a modified state.

20. The computer system of claim 10, wherein each of the items stored in the cache memory is one of a line, a block, and a page of memory.

\* \* \* \* \*

UNITED STATES PATENT AND TRADEMARK OFFICE
CERTIFICATE OF CORRECTION

PATENT NO. : 8,473,687 B2  
APPLICATION NO. : 13/464982  
DATED : June 25, 2013  
INVENTOR(S) : Blaine D Gaither Page 1 of 1

It is certified that error appears in the above-identified patent and that said Letters Patent is hereby corrected as shown below:

In the Claims:

In column 8, line 41, in Claim 13, delete "the a" and insert -- a --, therefor.

Signed and Sealed this  
Sixteenth Day of September, 2014

Michelle K. Lee  
*Deputy Director of the United States Patent and Trademark Office*